Aug. 23, 1966 W. F. GRIEDER 3,268,732
MULTIVIBRATOR RADIATION SENSOR
Filed March 4, 1963
3 Sheets-Sheet 1

INVENTOR.
WILLIAM F. GRIEDER
BY
ATTORNEYS

INVENTOR.
WILLIAM F. GRIEDER

United States Patent Office 3,268,732
Patented August 23, 1966

3,268,732
MULTIVIBRATOR RADIATION SENSOR
William F. Grieder, Dayton, Ohio, assignor to the United States of America as represented by the Secretary of the Air Force
Filed Mar. 4, 1963, Ser. No. 262,806
6 Claims. (Cl. 250—206)

The invention described herein may be manufactured and used by or for the U.S. Government for governmental purposes with payment to me of any royalty thereon.

This invention relates to a radiation sensor, and more particularly to a radiation sensor capable of producing electrical signals for control of mechanism in accordance with variations in applied light intensity or magnitude.

In order to maintain vertical attitude, it is necessary to have a vertical reference or a local vertical with respect to the space vehicle. The local vertical is the line which is normal to the surrounding earth's surface beneath the vehicle; it is the line perpendicular to the earth's reference spheroid at such a point that the outward extension of this line passes through the vehicle. A vertical reference can be established either by using the local gravity vector which coincides closely with the local vertical reference or by the method of horizon scanning. The use of the gravity vector is unsatisfactory because of the condition of "weightlessness" which causes the gravity vector within the space vehicle to vanish or reduce in magnitude to an extent where it would not be reliable.

The full circle of the earth's horizon constitutes an omnipresent reference which can be scanned, or sensed to provide a local vertical reference that is completely unaffected by any motion of the vehicle. If infrared methods are used, the scanning can be performed both at night and day and in substantially all types of surface weather. Two possible horizons are available to the scanner (1) the earth horizon itself, consisting of land and water surfaces; and (2) the atmospheric horizon consisting of either the stratosphere or troposphere.

This invention is a simple electronic device, containing no moving parts which provides a signal frequency sensitive to the intensity of radiation incident on a radiation detector. It has the capability of a wide range of operating frequency adjustable from below audio through the intermediate frequency region and exhibits good calibration capabilities. Most existing radiation equipment measures radiation by signal amplitude changes and utilize mechanical choppers and complex synchronous rectification. This invention utilizes a change in frequency as an indication of radiation change and has the advantages of no moving parts, simplified circuitry, compactness and low power requirment. The frequency modulation nature of this invention permits less critical electronic signal processing techniques. Also, the invention is versatile because different types of radiation detectors can be used to measure radiation of various spectral groups.

The invention operates by using an electronic multivibrator in which one or two of the resistors of the multivibrator are radiation sensors. As radiation upon these sensors vary, the value of the circuit elements vary, and as a result the multivibrator will vary its output. The output can then be processed into a sinusoid.

An object of this invention is to provide a radiation sensor capable of detecting radiation in various spectral regions.

Another object is to provide a radiation sensor utilizing a multivibrator whose output frequency is dependent on external radiation.

Another object is to provide a radiation sensor utilizing a multivibrator whose output can be converted into a sinusoid that has an amplitude dependent on etxernal radiation.

Another object is to provide a radiation sensor utilizing a multivibrator whose output can be converted into a sinusoid that has a frequency dependent on external radiation.

Another object is to provide a multivibrator utilizing one or more radiation detectors in its circuit.

Another object is to provide for an apparatus for controlling vertical altitude of space vehicles based upon the difference in radiation at the earth's horizon.

The foregoing and other objects and advantages of the invention will appear more fully hereinafter from a consideration of the detailed description which follows, taken together with the accompanying drawings wherein.

Figure 3:
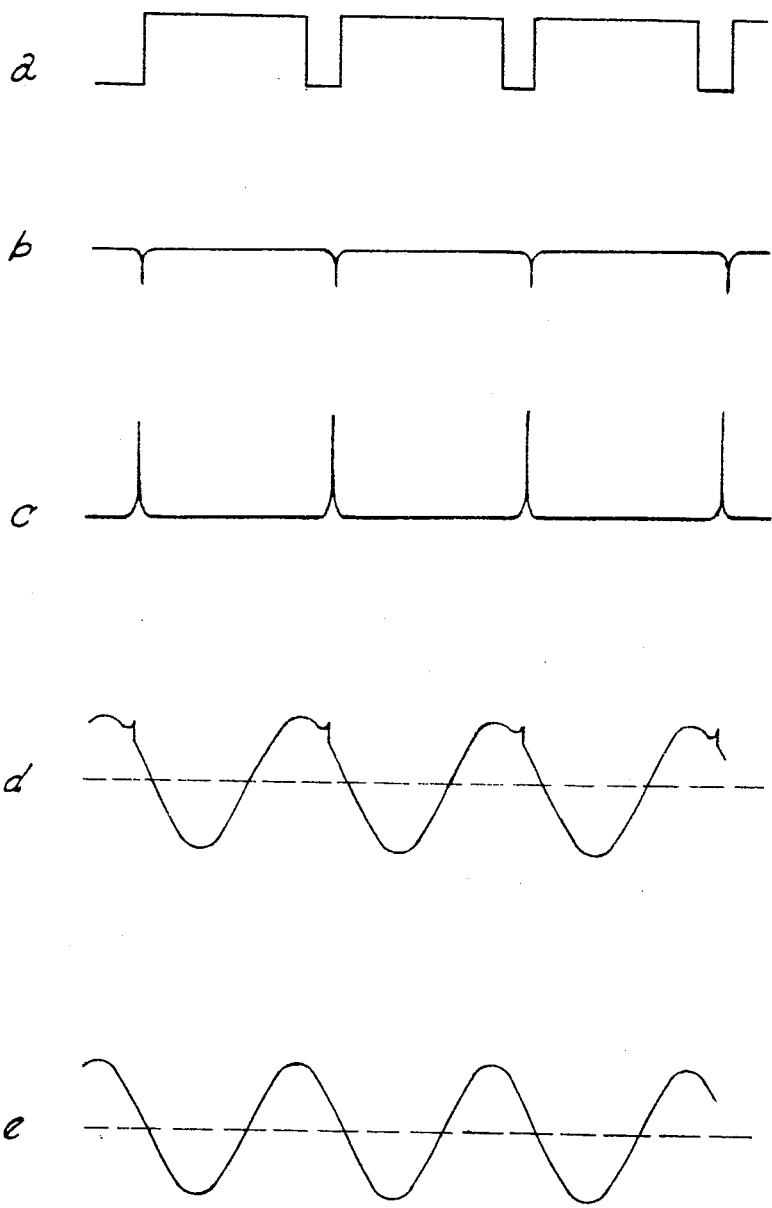

FIG. 3, characterisic waveforms of Multivibrator Radiation Sensor.

Figure 4:
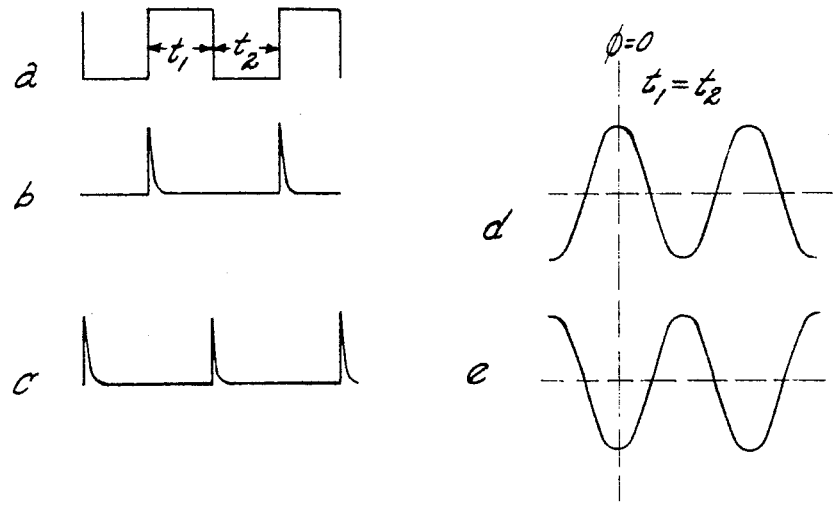
Figure 4:
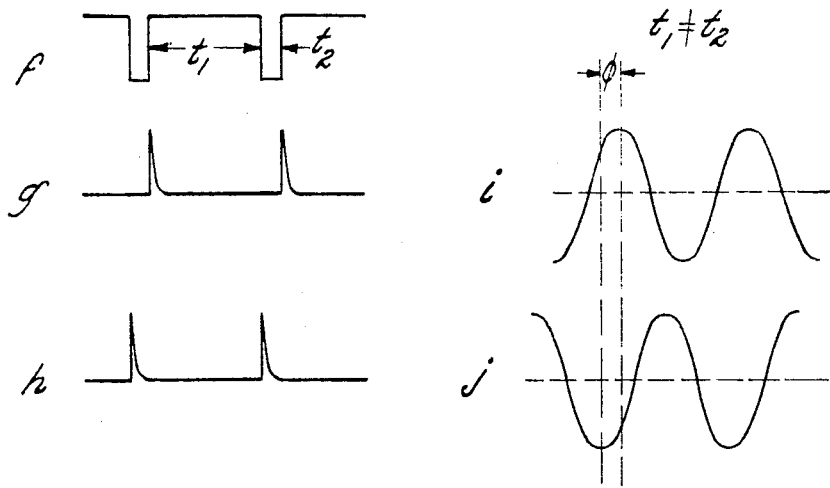

FIG. 4, characteristic waveform of Multivibrator Radiation Sensor used for vertical attitude control of space vehicle.

Figure 1:
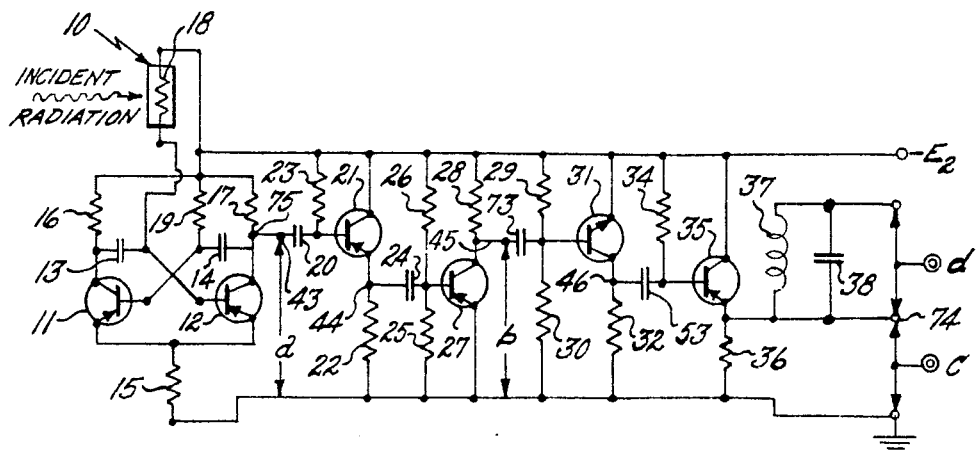
FIG. 1 is a circuit diagram for a Multivibrator Radiation Sensor using one radiation detector.

The basic Multivibrator Radiation Sensor shown in FIG. 1 comprises an astable multivibrator which includes transistors 11 and 12, coupling capacitors 13 and 14, common emitter resistor 15, load resistors 16 and 17, and biasing resistors 18 and 19. Biasing resistor 18 is the radiation detector which can be a lead sulfide cell but is not limited to such. The multivibrator output is taken from between point 75 and ground as shown at *a* of FIG. 4, and is connected to transistor 21, an emitter follower, by coupling capacitor 20. The bias resistor 23 is connected to the base of transistor 21 while load resistor 22 is connected to its emitter. The output of transistor 21, taken from between point 44 and ground, is connected to transistor 27 by coupling capacitor 24 which together with resistor 25 make up a differentiating circuit. Bias resistor 26 is connected to the base of transistor 27 while load resistor 28 is connected to its collector. The output of this transistor, taken between point 45 and ground, is connected to transistor 31 by coupling capacitor 73. Resistors 29 and 30 serve as a voltage dividing biasing network. The output of transistor 31 is taken from between point 46 and ground across load resistor 32 which is connected to the collector of transistor 31. This output is transferred to transistor 35, an emitter follower, by coupling capacitor 53. Biasing resistor 34 is connected to the base and load resistor 36 is connected to the emitter of transistor 35. The output of this transistor, taken from between point 74 and ground, is used to trigger the resonant tank circuit composed of inductor 37 and capacitor 38. Although the invention is described using transistors, vacuum tubes may be substituted.

Figure 2:
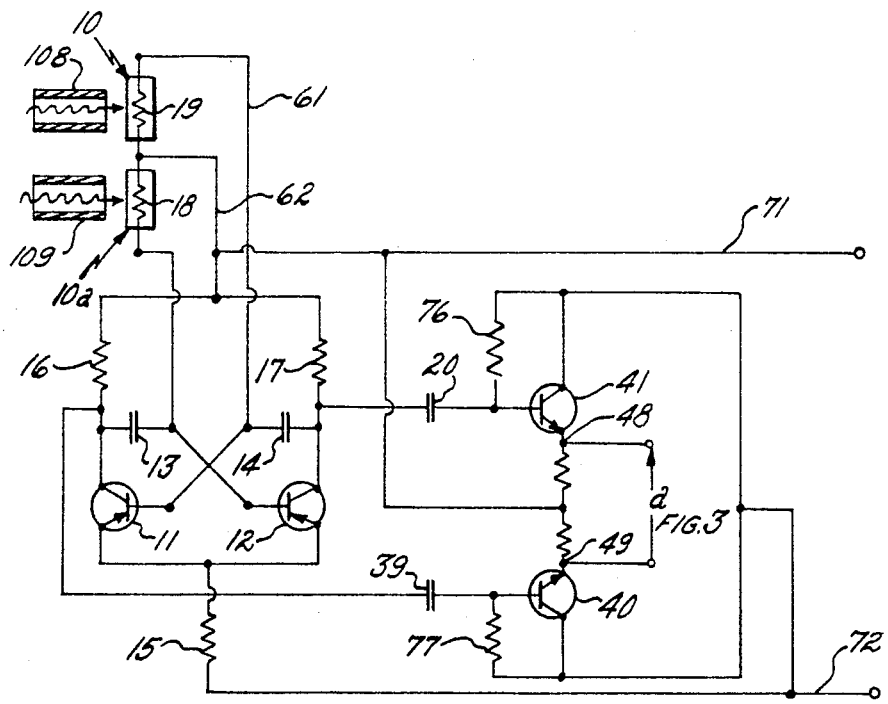
FIG. 2 is a circuit diagram for a Multivibrator Radiation Sensor using two radiation detectors.

The basic circuit can be modified as shown in FIG. 2 to have two of the resistors, namely 18 and 19, responsive to the radiation energy. The output in FIG. 2 is taken through emitter followers, transistor 40 and 41, between points 48 and 49. In this circuit the radiation detectors 18 and 19 are matched and the value of capacitors 13 and 14 are made equal.

In operation of the basic radiation sensor, resistor 18 of the multivibrator is a lead sulfide radiation detector or other appropriate detector. By selecting capacitors 13 and 14 and resistor 19 so the product of capacitor 14 and resistor 19 is negligible as compared with the product of capacitor 13 and resistor 18, then with no incident radiation on the detector 18 the multivibrator will oscillate at a frequency approximately equal to the reciprocal of the product of the values of capacitor 13 and resistor 18. This resistance would be equal to the dark resistance of the detector. Since the detector will change resistance dependent upon the intensity of radiation incident on its surface, the output frequency will change also dependent upon this radiation. In this manner the output frequency affords a measure of the intensity of incident radiation. The base operating frequency is adjustable over a wide range by selecting the appropriate values of capacitors 13 and 14 and resistor 19.

Referring now to FIGS. 1 and 3, a periodic square wave either symmetrical or non-symmetrical as shown in $a$ of FIG. 3 is taken from the multivibrator between point 43 and ground. This signal is processed and appears between point 45 and ground as a spike as shown in $b$ of FIG. 4 which is then inverted and amplified which is shown at $c$ of FIG. 4 when taken between point 74 and ground. This spike drives a high Q resonant tank composed of inductor 37 and capacitor 38 which produces a sinusoid as shown in $d$ of FIG. 4. Removal of the spike on the sinusoid as shown at $e$ can be accomplished with conventional low-pass filtering techniques.

The resonant frequency of the tank is chosen so that the multivibrator output frequency from dark frequency to maximum anticipated frequency lies within the linear region of the tank's Q characteristics. Incident radiation on the detector causes a frequency change from dark frequency and results in a sinusoidal output with amplitude dependent upon the radiation. Rectifying the sinusoid will produce a D.-C. signal whose level is a function of the intensity of incident radiation.

The output frequency of the resonant tank is also proportional to the incident radiation on the detector.

For the Multivibrator Radiation Sensor with two radiation detectors, the multivibrator uses two matched detectors which are resistors 18 and 19 as shown in FIG. 2.

If capacitors 13 and 14 are made equal and for all conditions the product of capacitor 13 and resistor 18 is equal to the product of capacitor 14 and resistor 19, the output taken from between emitters of transistors 40 and 41 as shown in FIG. 2 will be a symmetrical square wave, which enables more quantitative data to be obtained.

This Multivibrator Radiation Sensor with dual detectors can be used to control the vertical attitude of space vehicles. Referring to FIG. 4, when the attitude of the space vehicle is vertical the output of the multivibrator results in a symmetrical square wave as shown in $a$ where $t_1 = t_2$. This square wave is differentiated into two pulse channels as shown in $b$ and $c$ which are then processed to produce two sinusoids as shown in $d$ and $e$ that are the same frequency and amplitude but differ in phase by 180°. Adding the two sinusoids produces the error signal, $\phi$, which will be zero when the vehicle is vertical. When the vehicle is not vertical the output of the multivibrator is a non-symmetrical square wave as shown at $f$ where $t_1 \neq t_2$. This square wave is differentiated into two pulse channels as shown in $g$ and $h$ which are then processed to produce two sinusoids as shown at $i$ and $j$. Adding the two sinusoids produces the proper error signal $\phi$, which represents the difference between 180° and the phase difference. Since the vehicle is spinning the error signal will be modulated at a frequency depending on the spin rate. The presence of the error signal determines that a correction is necessary and the modulation determines the time to apply the correction.

What is claimed is:

1. An apparatus for generating an error signal for controlling vertical attitude of a space vehicle comprising two radiation detectors located at opposing ends of said space vehicle, an astable multivibrator having said radiation detectors as integral circuit elements and having a frequency dependent upon the radiation upon said radiation detectors, means for processing output of said astable multivibrator into two pulse trains, means for converting said pulse train into two sinusoids, means for comparing phase of said sinusoids.

2. A radiation detecting circuit comprising: an astable multivibrator having two electron amplifying devices with interconnecting circuits and having a radiation detector receiving radiant energy in one of the said interconnecting circuits for controlling the frequency of said multivibrator in accordance with variations in the amount of radiation sensed by said radiation detectors; means for processing the output of said multivibrator into spikes; and a resonant tank circuit triggered by said spikes from said processing means and having a sinusoidal output dependent on said spikes.

3. An error detecting circuit comprising: an astable multivibrator having two electronic amplifying devices with two interconnecting circuits and having a radiation detector receiving radiant energy in each of said interconnecting circuits for controlling the frequency of said multivibrator in accordance with variations in the amount of radiation sensed by said radiation detectors; means for processing the output of said multivibrator into spikes; and a resonant tank circuit triggered by said spikes by said processing means and having a sinusoidal output dependent on said spikes.

4. A radiation detector according to claim 2 wherein the means for processing the output of said multivibrator into spikes comprises: a differentiating circuit and an inverting circuit connected to the output of said multivibrator.

5. A radiation detector according to claim 4 which further comprises: a low-pass filter connected to the output of said resonant tank circuit for removing the spikes from the sinusoid.

6. A radiation detector according to claim 5 wherein the radiation detector is a lead sulfide cell.

References Cited by the Examiner
UNITED STATES PATENTS

| | | | |
|---|---|---|---|
| 2,903,204 | 9/1959 | Nyman et al. | 244—14 |
| 2,984,729 | 3/1961 | Hykes et al. | 331—66 |
| 3,049,670 | 8/1962 | Paulson | 244—1 |

RALPH G. NILSON, *Primary Examiner.*

SAMUEL FEINBERG, *Examiner.*

L. L. HALLACHER, J. D. WALL, *Assistant Examiners.*